(12) United States Patent
Laurello et al.

(10) Patent No.: US 9,032,738 B2
(45) Date of Patent: May 19, 2015

(54) GAS TURBINE COMPRESSOR WITH BLEED PATH

(75) Inventors: Vincent P. Laurello, Hobe Sound, FL (US); Kok-Mun Tham, Orlando, FL (US)

(73) Assignee: Siemens Aktiengesellschaft, München (DE)

(*) Notice: Subject to any disclaimer, the term of this patent is extended or adjusted under 35 U.S.C. 154(b) by 487 days.

(21) Appl. No.: 13/455,509

(22) Filed: Apr. 25, 2012

(65) Prior Publication Data
US 2013/0283813 A1   Oct. 31, 2013

(51) Int. Cl.
F02C 6/08 (2006.01)
F02C 6/04 (2006.01)

(52) U.S. Cl.
CPC ........................................ *F02C 6/08* (2013.01)

(58) Field of Classification Search
CPC ................. F02C 6/08; F02C 9/18; F02C 9/16
USPC ...................... 60/782, 785, 806; 415/115, 116
See application file for complete search history.

(56) References Cited

U.S. PATENT DOCUMENTS

| | | | |
|---|---|---|---|
| 2,618,433 A | | 11/1952 | Loos et al. |
| 2,636,665 A | * | 4/1953 | Lombard ...................... 417/368 |
| 4,008,977 A | | 2/1977 | Brown et al. |
| 4,127,988 A | * | 12/1978 | Becker ............................ 60/726 |
| 4,335,995 A | | 6/1982 | Riollet et al. |
| 4,795,307 A | * | 1/1989 | Liebl ............................ 415/115 |
| 4,919,590 A | | 4/1990 | Stratford et al. |
| 5,685,158 A | * | 11/1997 | Lenahan et al. ................ 60/726 |
| 6,427,448 B1 | * | 8/2002 | Reichert ......................... 60/772 |
| 7,086,830 B2 | | 8/2006 | Fitzgerald et al. |
| 7,159,402 B2 | | 1/2007 | Hein et al. |
| 7,934,901 B2 | | 5/2011 | Moniz et al. |
| 8,240,975 B1 | * | 8/2012 | Ryznic .............................. 415/1 |
| 2007/0234737 A1 | * | 10/2007 | Vosberg .......................... 60/785 |
| 2008/0159864 A1 | * | 7/2008 | Hoell ............................. 416/179 |
| 2009/0282834 A1 | | 11/2009 | Hein |
| 2012/0027606 A1 | * | 2/2012 | Malmborg ................ 416/223 A |

* cited by examiner

*Primary Examiner* — Gerald L Sung

(57) ABSTRACT

A gas turbine engine includes a compressor for generating compressed air. The compressor includes a rotor defined by a plurality of axial disks including a first disk and a second disk. A first row of blades extends radially outwardly from the first disk, and a second row of blades extends radially outwardly from the second disk. A row of cantilevered vanes is located at an axial location between the first row of blades and the second row of blades. A bleed path extends at least partially through the second disk and includes an entrance at an axial location between the first row of blades and at least a portion of the row of cantilevered vanes. The entrance communicates with a compressed air flowpath through the compressor.

16 Claims, 4 Drawing Sheets

GAS TURBINE COMPRESSOR WITH BLEED PATH

FIELD OF THE INVENTION

This invention relates in general to a gas turbine engine and more particularly to a bleed path within a compressor of the gas turbine engine for bleeding air from the compressor to a turbine of the gas turbine engine.

BACKGROUND OF THE INVENTION

Bleeding air from the compressor to the turbine of a gas turbine engine is desirable for cooling the turbine and providing sealing pressure between turbine components. Pressure losses in a bleed path through which the air flows are preferably minimized in order to provide sufficient cooling and sealing within the turbine and to increase gas turbine engine efficiency.

SUMMARY OF THE INVENTION

In accordance with a first aspect of the present invention, a gas turbine engine is provided comprising a compressor for generating compressed air. The compressor comprises a rotor defined by a plurality of axial disks, wherein the disks comprise a first disk and a second disk. A first row of blades extends radially outwardly from the first disk, and a second row of blades extends radially outwardly from the second disk. A row of cantilevered vanes is located at an axial location between the first row of blades and the second row of blades. A bleed path extends at least partially through the second disk and comprises an entrance at an axial location between the first row of blades and at least a portion of the row of cantilevered vanes. The entrance communicates with a compressed air flowpath through the compressor.

The entrance of the bleed path may comprise an annular first passage that defines a free vortex passage. The bleed path may further comprise at least one second passage having a first end communicating with the first passage, the second passage extending through the second disk and defining a forced vortex passage. The at least one second passage may extend in radial and axial directions and may further comprise a second end located downstream from the second row of blades. The at least one second passage may comprise two or more second passages, each second passage comprising a first end communicating with the first passage. The two or more second passages may be circumferentially spaced apart from one another. The second disk may comprise a substantially vertical face, wherein the first end of the second passage may be defined in the vertical face.

The gas turbine engine may further comprise an inner passage in fluid communication with the bleed path through which compressed air from the compressor travels toward a turbine of the gas turbine engine.

The bleed path may comprise at least one passage having a first end defining the bleed path entrance and communicating with the compressed air flowpath, the at least one passage extending through the second disk, which may extend in radial and axial directions. The second disk may comprise a substantially horizontal surface from which the second row of blades extends, the first end of the at least one passage being defined in the horizontal surface. The at least one passage may comprise two or more passages, each passage comprising a first end communicating with the compressed air flowpath. The two or more second passages may be circumferentially spaced apart from one another.

In accordance with a second aspect of the present invention, a method is provided of guiding bleed air from an air flowpath extending through a compressor in a gas turbine engine. A rotor is provided that is at least partially defined by a plurality of axial disks, the disks comprising a first disk from which a first row of blades extends and a second disk from which a second row of blades extends and downstream from the first disk with respect to a direction of the air flowpath. A row of cantilevered vanes is provided between the first row of blades and the second row of blades. Bleed air is passed through a bleed path having an entrance at a location downstream from the first row of blades and upstream from at least a portion of the row of cantilevered vanes. At least a portion of the bleed path extends through the second disk.

The bleed air may be passed from the location downstream of the first row of blades and upstream of at least a portion of the row of cantilevered vanes through an annular first passage, and from the annular first passage through at least one second passage defined in the second disk, which at least one second passage may comprise a plurality of circumferentially spaced apart second passages.

The at least one passage of the bleed path may have a first end defining the entrance and communicating with the compressed air flowpath, and the at least one passage may extend in radial and axial directions through the second disk.

Bleed air may be passed from the bleed path into an inner passage in fluid communication the bleed path, where the bleed air flows through the inner passage toward a turbine of the gas turbine engine.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
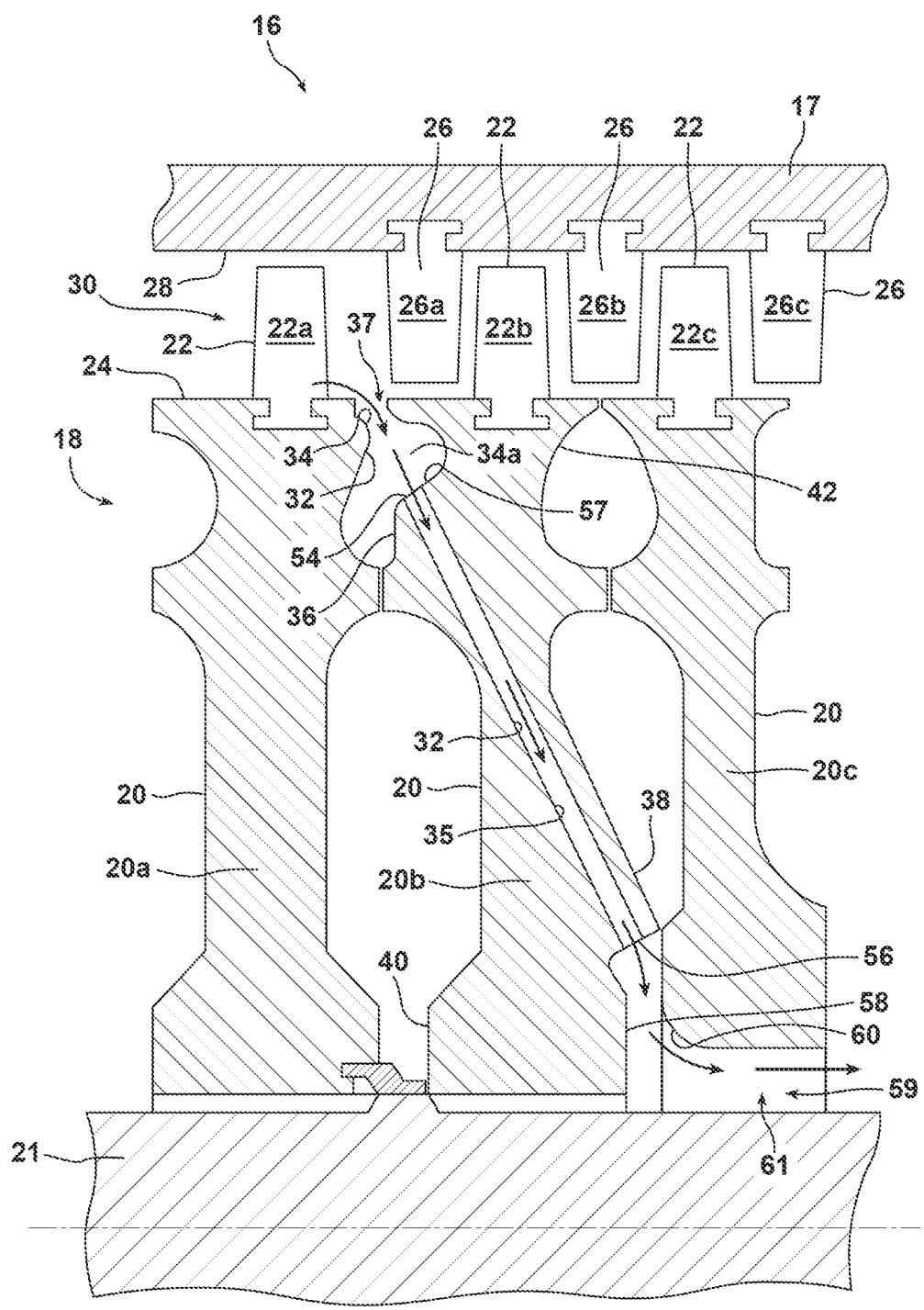
FIG. 1 is an enlarged partial cross-sectional view of a compressor of a gas turbine engine having a bleed path according to an aspect of the present invention.

Reference is made to FIG. 1, which shows a compressor 16 of an industrial gas turbine engine assembly. The compressor 16 in the illustrated embodiment is housed in an engine casing 17, which at least partially surrounds the compressor 16. The compressor 16 compresses air that flows through a compressed air flowpath 30, wherein a portion of the compressed air is sent to a combustion section including one or more combustors (not shown). At least a portion of the compressed air provided to the combustion section is mixed with fuel and ignited within the combustors to produce hot working gases, which are provided to a turbine (not shown) where the hot working gases are converted into rotational energy, as will be apparent to those skilled in the art.

The compressor 16 of the present invention comprises a rotatable rotor 18 defined in part by a plurality of rotatable disks 20 comprising disk-shaped axial sections surrounding a rotatable shaft 21. Each disk 20 is associated with a plurality of circumferentially-spaced blades 22 that extend in a radially outward direction from an outer surface 24 of the corresponding disk 20. The blades 22 rotate with the rotor 18 during operation of the engine. The compressor 16 illustrated in FIG. 1 includes a first row of blades 22a extending radially outwardly from a first disk 20a, a second row of blades 22b extending radially outwardly from a second disk 20b, and a third row of blades 22c extending radially outwardly from a third disk 20c. It is noted that the compressor 16 may include additional rows of blades associated with additional disks.

The compressor 16 further comprises rows of stationary cantilevered vanes 26 extending in a radially inward direction from an inner surface 28 of the engine casing 14. The compressor 16 illustrated in FIG. 1 includes a first row of vanes 26a, a second row of vanes 26b, and a third row of vanes 26c positioned between the respective rows of blades 22a-22c, i.e., the rows of vanes 26a-26c are axially spaced from each other such that each row of vanes 26a-26c is positioned downstream from a respective row of blades 22a-22c in the compressed air flowpath 30. It is noted that the compressor 16 may include additional rows of vanes, and that the number of rows of blades preferably corresponds to the number of rows of vanes.

Referring still to FIG. 1, a bleed path 32 associated with the second disk 20b of, the rotor 18 is provided for carrying bleed air, which comprises a portion of the compressed air from the air flowpath 30, toward the turbine. The bleed path 32 in the embodiment shown comprises an entrance 34 defined by an annular first passage 34a located between the first and second disks 20a, 20b of the rotor 18. The bleed path 32 further comprises at least one second passage 35 that extends in axial and radial directions through the second disk 20b of the rotor 18. In the embodiment shown, an inlet to the entrance 34 of the bleed path 32 from the air flowpath 30 is a continuous annular opening 37 formed between the first and second disks 20a, 20b of the rotor 18.

The entrance 34 of the bleed path 32 according to this embodiment is associated with an upstream side 36 of a radially outer end 42 of the second disk 20b of the rotor 18. The entrance 34 is defined between an upstream boundary on the first disk 20a and a downstream boundary on the second disk 20b, e.g., the entrance 34 is located downstream from the first row of blades 22a and upstream from at least a portion of the first row of vanes 26a. The entrance 34 defines a free vortex passage since it is not forced to rotate with the rotor 18, i.e., since the entrance 34 comprises an annular passage that is not circumferentially bound by the rotor 18. While the entrance 34 defines a free vortex passage, it is noted that the free vortex flow of the bleed air in the entrance 34 rotates in the same direction as the rotor 18, i.e., as a result of circumferential velocity component imparted on the bleed air by the first row of blades 22a, which rotate with the rotor 18. The entrance 34 is in communication with the air flowpath 30 and receives a portion of the compressed air flowing through the air flowpath 30.

The at least one second passage 35 of the bleed path 32 preferably comprises a plurality of circumferentially spaced apart second passages 35, e.g., an annular array of second passages 35. The second passages 35 each comprise a first end 54 that communicates with the entrance 34 of the bleed path 32 and a second end 56 located downstream from the second row of blades 22b at a downstream side 38 of a radially inner end 40 of the second disk 20b. Since the second passages 35 of the bleed path 32 are formed through the rotatable second disk 20b of the rotor 18 and are thus circumferentially bound by the rotor 18, the second passages 35 are forced to rotate with the rotor 18 and define forced vortex passages.

As illustrated in FIG. 1, an entry surface 57 of the second disk 20b located at the first ends 54 of the second passages 35 is formed generally perpendicular to a longitudinal axis of each second passage 35 such that bleed air passing through the bleed path 32 may more easily enter the second passages 35 from the entrance 34 through their first ends 54.

The second passages 35 deliver the bleed air to a radial portion 58 of an inner passage 59 that carries the bleed air toward the turbine. The radial portion 58 is defined between the second disk 20b and the third disk 20c of the rotor 18 near the shaft 21 and comprises an annular cavity so as to create a free vortex cavity that is not forced to rotate with the rotor 18. The bleed air from the bleed path 32 flows in a generally radially inward direction through the radial portion 58 of the inner passage 59 to a generally axially extending portion 61 of the inner passage 59, as shown in FIG. 1. The generally axially extending portion 61 of the inner passage 59 may comprise an annular cavity so as to create a free vortex passage that is not forced to rotate with the rotor 18. The bleed air flows generally axially through the generally axially extending portion 61 adjacent to the shaft 21 toward the turbine.

As shown in FIG. 1, the third disk 20c of the rotor 18 may be shaped with a filet or rounded corner 60 at its upstream, inner edge in order to reduce flow resistance as the bleed air flows from the radially extending radial portion 58 to the generally axially extending portion 61 of the inner passage 59. In another embodiment, the second passages 35 could extend all the way to the radially innermost end of the second disk 20b so as to deliver the bleed air directly to the generally axially extending portion 61 of the inner passage 59.

In accordance with the present invention, since the bleed air enters the bleed path 32 directly downstream from rotating blades 22, e.g., the rotating first blades 22a in the illustrated embodiment, the bleed air includes a greater circumferential velocity component than if the bleed air were to enter a bleed path located directly downstream from stationary vanes 26, since the rotating blades 22 increase the circumferential velocity component of the air flowing through the gas flowpath 30, and the stationary vanes 26 reduce the circumferential velocity component of the air flowing through the gas flowpath 30. Hence, a swirl ratio of the bleed air entering the bleed path 32 versus the rotor 18 is closer to one than if the bleed air were to enter a bleed path located directly downstream from a row of stationary vanes 26. The rotor 18 is thus not required to increase the circumferential velocity component of the bleed air as much as if the bleed path 32 were located directly downstream from a row of stationary vanes 26. This is desirable, as the rotor 18 must expend work in order to increase the circumferential velocity component of the bleed air to bring the swirl ratio of the bleed air in the bleed path 32 versus the rotor 18 to one, and the greater the amount of work that is required by the rotor 18 in this regard is believed to be proportional to a pressure drop and a temperature increase of the bleed air. Such pressure losses and temperature increases are undesirable, as they would increase the amount of bleed air required to be sent to the turbine for cooling of the components in the turbine that are cooled by the bleed air.

Additionally, due to the reduction in the amount of work that is required by the rotor 18 to increase the circumferential velocity component of the bleed air, the efficiency and output of the engine is increased or the amount of fuel required to achieve the same output is reduced.

Figure 2:
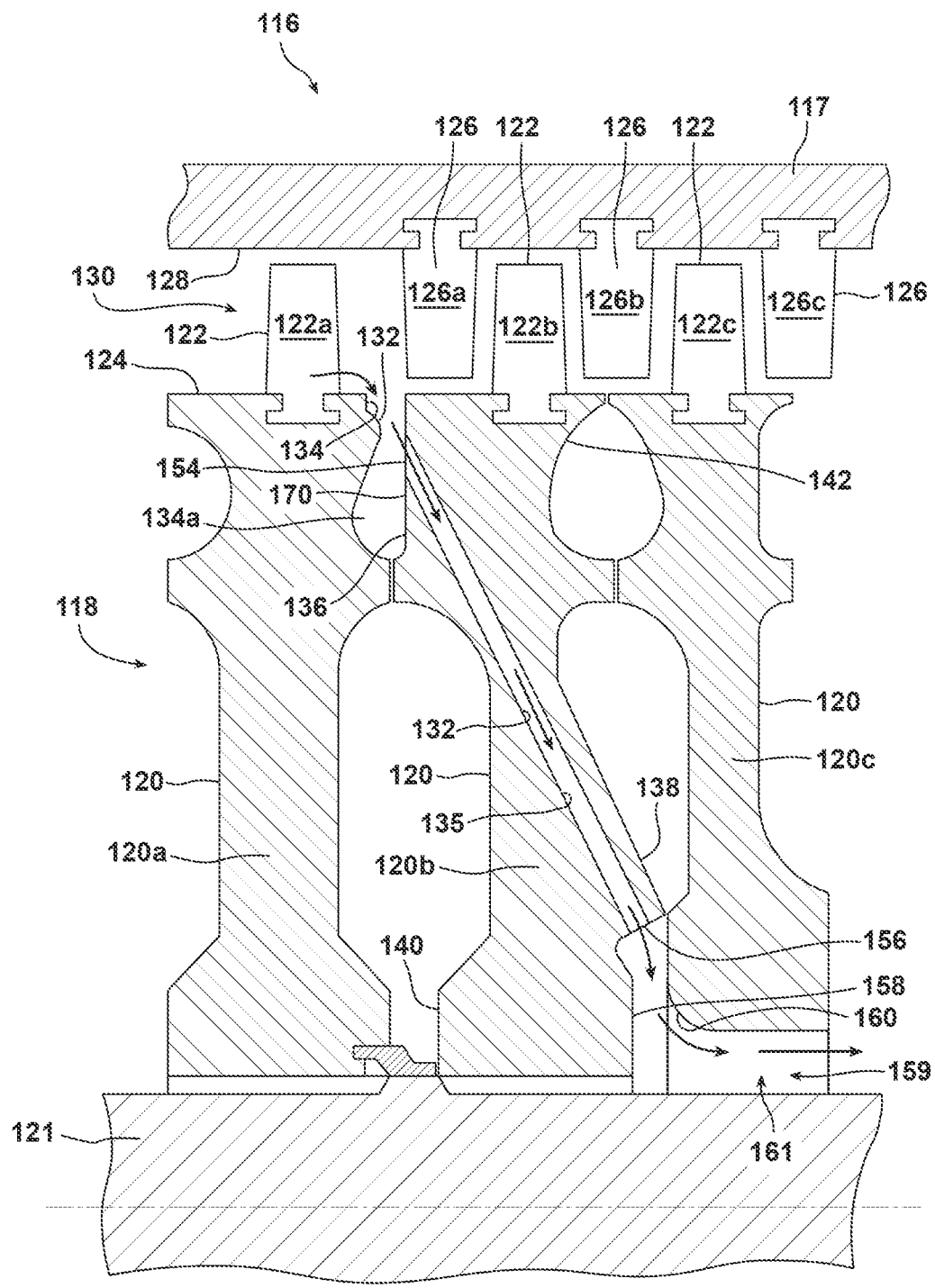
FIG. 2 is an enlarged partial cross-sectional view of a compressor of a gas turbine engine having a vertical face and a bleed path according to another aspect of the present invention.

A second embodiment of the present invention is illustrated in FIG. 2, where elements common to the embodiment of FIG. 1 are referenced by the same reference numerals increased by 100. In the FIG. 2 embodiment, the second disk 120*b* of the rotor 118 comprises a substantially vertical face 170 that defines a downstream boundary for the first passage 134*a* of the bleed path 132. The first ends 154 of the second passages 135 of the bleed path 132 communicate with the first passage 134*a* of the bleed path 132. As shown in FIG. 2, the first ends 154 are defined in the vertical face 170 of the second disk 120*b* of the rotor 118. The second passages 135 according to this embodiment may comprise larger diameter bores than the second passages 35 illustrated in the first embodiment shown in FIG. 1.

Figure 2A:
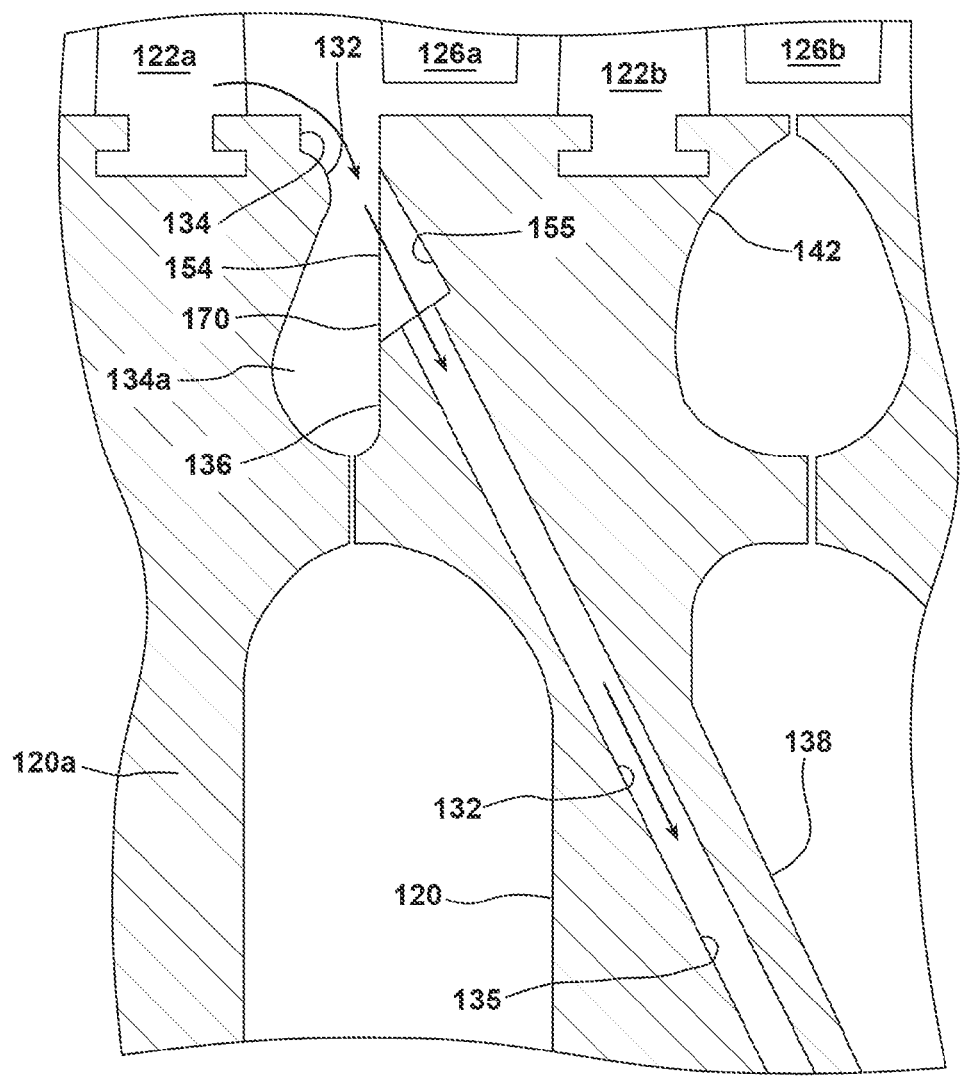
FIG. 2A illustrates an alternate passage first end of the bleed path illustrated in FIG. 2.

Referring to FIG. 2A, the first ends 154 of the second passages 135 could be in fluid communication with a counterbore 155 that is formed in the vertical face 170 of the second disk 120*b*. The counterbore 155 may be provided to maximize bleed air flow into the first ends 154 of the second passages 135 and also for manufacturability.

Figure 3:
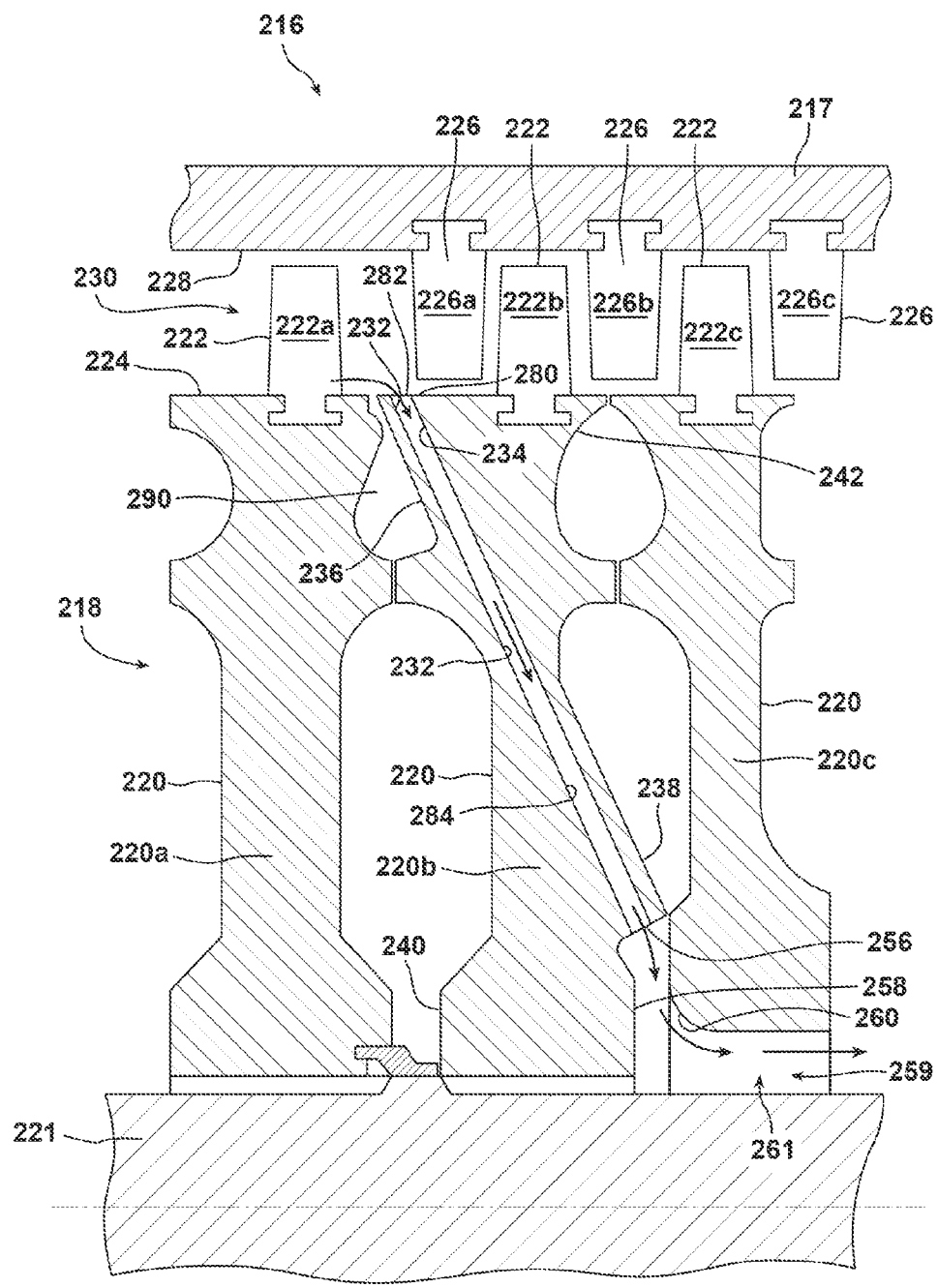
FIG. 3 is an enlarged partial cross-sectional view of a compressor of a gas turbine engine having a horizontal face and a bleed path according to yet another aspect of the present invention.

A third embodiment of the present invention is illustrated in FIG. 3, where elements common to the embodiment of FIG. 1 are referenced by the same reference numerals increased by 200. In the FIG. 3 embodiment, the second disk 220*b* of the rotor 218 comprises a substantially horizontal surface 280 located adjacent to the air flowpath 230. First ends 282 of one or more passages 284 of the bleed path 232 extend through the second disk 220*b* and communicate with the air flowpath 230. The first ends 282 are positioned adjacent to, i.e., downstream from, an inter-stage cavity 290, which is located directly upstream from the radially outer end 242 of the second disk 220*b* of the rotor 218. The bleed path 232 according to this embodiment bypasses the free vortex inter-stage cavity 290 and flows directly from the air flowpath 230 into the forced vortex paths defined by the passages 284.

According to this embodiment, the radial lengths of the passages 284 may be increased to maximize the (effective length) of the passages 284. Further the inlet diameters of the forced vortex passages 284 may be increased.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising a compressor for generating compressed air comprising:
    a rotor defined by a plurality of disks, wherein said disks comprise a first disk and a second disk;
    a first row of blades extending radially outwardly from said first disk;
    a second row of blades extending radially outwardly from said second disk;
    a row of cantilevered vanes at an axial location between said first row of blades and said second row of blades; and
    a bleed path extending at least partially through said second disk and comprising an entrance at an axial location between said first row of blades and at least a portion of said row of cantilevered vanes, said entrance communicating with a compressed air flowpath through said compressor;
    wherein said entrance comprises an annular first passage that defines a free vortex passage, said first passage is located at an outer horizontal surface of said first and second disks and is formed by a gap defined between an upstream boundary on said first disk and a downstream boundary on said second disk, both said upstream and downstream boundaries being at an axial location between said first row of blades and said row of cantilevered vanes.

2. The gas turbine engine as set forth in claim 1, wherein said bleed path further comprises at least one second passage having a first end communicating with said first passage, said second passage extending through said second disk and defining a forced vortex passage.

3. The gas turbine engine as set forth in claim 2, wherein said at least one second passage extends in radial and axial directions and further comprises a second end located downstream from said second row of blades.

4. The gas turbine engine as set forth in claim 2, wherein said at least one second passage comprises two or more second passages, each second passage comprising a first end communicating with said first passage.

5. The gas turbine engine as set forth in claim 4, wherein said two or more second passages are circumferentially spaced apart from one another.

6. The gas turbine engine as set forth in claim 2, wherein said second disk comprises a substantially vertical face, said first end of said at least one second passage being defined in said vertical face.

7. The gas turbine engine as set forth in claim 1, further comprising an inner passage in fluid communication with said bleed path through which compressed air from said compressor travels toward a turbine of the gas turbine engine.

8. A gas turbine engine comprising a compressor for generating compressed air comprising:
    a rotor defined by a plurality of disks, wherein said disks comprise a first disk and a second disk;
    a first row of blades extending radially outwardly from said first disk;
    a second row of blades extending radially outwardly from said second disk, said second disk including a substantially horizontal surface from which said second row of blades extends;
    a row of cantilevered vanes at an axial location between said first row of blades and said second row of blades;
    a bleed path extending at least partially through said second disk and comprising an entrance at an axial location between said first row of blades and at least a portion of said row of cantilevered vanes, said entrance communicating with a compressed air flowpath through said compressor; and
    wherein said bleed path comprises at least one passage having a first end defining said entrance of said bleed path and communicating with said compressed air flowpath, said at least one passage extending through said second disk, said first end of said at least one passage being defined in said horizontal surface at an axial location downstream from an upstream side of said second disk and upstream of said row of cantilevered vanes.

9. The gas turbine engine as set forth in claim 8, wherein said at least one passage extends in radial and axial directions.

10. The gas turbine engine as set forth in claim 8, wherein said at least one passage comprises two or more passages, each passage comprising a first end communicating with said compressed air flowpath.

11. The gas turbine engine as set forth in claim 10, wherein said two or more second passages are circumferentially spaced apart from one another.

12. A method of guiding bleed air from an air flowpath extending through a compressor in a gas turbine engine comprising:
   providing a rotor at least partially defined by a plurality of axial disks, the disks comprising a first disk from which a first row of blades extends and a second disk from which a second row of blades extends, the second disk being downstream from the first disk with respect to a direction of the air flowpath;
   providing a row of cantilevered vanes between the first row of blades and the second row of blades; and
   passing bleed air from the air flowpath through a bleed path having an entrance at a location downstream from the first row of blades and upstream from at least a portion of the row of cantilevered vanes, at least a portion of the bleed path extending through the second disk;
   wherein said entrance is located at an outer horizontal surface of said second disk and is at an axial location downstream from a downstream side of said first disk and upstream of said row of cantilevered vanes.

13. The method as set forth in claim 12, wherein said passing bleed air comprises:
   passing the bleed air from the location downstream from the first row of blades and upstream from at least a portion of the row of cantilevered vanes through an annular first passage of the bleed path; and
   passing the bleed air from the annular first passage through at least one second passage of the bleed path defined in the second disk.

14. The method as set forth in claim 13, wherein said passing the bleed air from the annular first passage through at least one second passage comprises passing the bleed air from the annular first passage through a plurality of circumferentially spaced apart second passages.

15. The method as set forth in claim 12, wherein said passing bleed air comprises passing the bleed air through at least one passage of the bleed path having a first end defining the entrance and communicating with the compressed air flowpath, the at least one passage extending in radial and axial directions through the second disk.

16. The method as set forth in claim 12, further comprising passing the bleed air from the bleed path into an inner passage in fluid communication the bleed path, the bleed air flowing through the inner passage toward a turbine of the gas turbine engine.

* * * * *